United States Patent [19]

Sager, Jr.

[11] Patent Number: 5,482,681
[45] Date of Patent: Jan. 9, 1996

[54] CATALYTIC CONVERTER FOR MOTOR VEHICLES

[75] Inventor: Robert L. Sager, Jr., Grass Lake, Mich.

[73] Assignee: Tennessee Gas Pipeline Company, Deerfield, Ill.

[21] Appl. No.: 754,042

[22] Filed: Sep. 3, 1991

Related U.S. Application Data

[63] Continuation of Ser. No. 175,150, Mar. 30, 1988, abandoned, which is a continuation-in-part of Ser. No. 778,023, Sep. 20, 1985, abandoned.

[51] Int. Cl.$^6$ .................... B01D 50/00; F28D 21/00
[52] U.S. Cl. .................... 422/180; 422/117; 422/182; 422/202
[58] Field of Search ...................... 422/177, 180, 422/182, 202; 181/241, 243, 282, 283

[56] References Cited

U.S. PATENT DOCUMENTS

| | | | |
|---|---|---|---|
| 3,042,138 | 7/1962 | Reinert | 181/64 |
| 3,390,738 | 7/1968 | Kirsch et al. | 181/241 |
| 4,048,363 | 9/1977 | Langer et al. | 428/77 |
| 4,152,301 | 5/1979 | Summers et al. | 502/333 |
| 4,225,561 | 9/1980 | Torres | 422/171 |
| 4,238,456 | 12/1980 | Jalbing | 422/180 |
| 4,256,700 | 3/1981 | Smith et al. | 422/177 |
| 4,269,807 | 5/1981 | Bailey et al. | 422/179 |
| 4,279,326 | 7/1981 | Meineke et al. | 181/228 |
| 4,328,188 | 5/1982 | Kawata | 422/180 |
| 4,335,078 | 6/1982 | Ushijima et al. | 422/179 |
| 4,382,323 | 5/1983 | Chapman et al. | 29/157 R |
| 4,385,135 | 5/1983 | Langer et al. | 422/179 |
| 4,475,623 | 10/1984 | Gerber et al. | 181/243 |
| 4,478,310 | 10/1984 | Harter | 181/241 |
| 4,516,659 | 5/1985 | Hall et al. | 181/243 |
| 4,521,532 | 6/1985 | Cho | 502/439 |
| 4,559,205 | 12/1985 | Hood | 422/180 |
| 4,609,067 | 9/1986 | Gonwa | 181/243 |

FOREIGN PATENT DOCUMENTS

1602991  11/1981  United Kingdom.

Primary Examiner—Robert J. Warden
Assistant Examiner—Christopher Y. Kim
Attorney, Agent, or Firm—Harness, Dickey & Pierce

[57] ABSTRACT

An aftermarket catalytic converter for motor vehicle exhaust gas systems has a clamshell housing with an upper heat shield and stainless steel inlet and outlet bushings and contains a catalyst coated substrate cushioned and supported inside of it by a heat expandable mat, the features and parts of the converter being constructed and arranged to enable one converter construction to be used as a replacement converter in a substantial number of different applications for the original equipment converters.

11 Claims, 5 Drawing Sheets

CATALYTIC CONVERTER FOR MOTOR VEHICLES

CROSS-REFERENCE TO THE ABOVE INVENTION

This is a continuation of United States patent application Ser. No. 07/175,150, filed Mar. 30, 1988, entitled "Catalytic Converter for Motor Vehicles", now abandoned, which is a continuation-in-part of application Ser. No. 06/778,023, filed Sep. 20, 1985, now abandoned.

BACKGROUND OF THE INVENTION

This invention relates to catalytic converters for internal combustion engine exhaust systems and, in particular, to aftermarket catalytic converters intended for installation in motor vehicles as replacements for original equipment ("O.E.") converters (i.e. those installed on the production lines of the vehicle manufacturers).

BRIEF SUMMARY OF THE INVENTION

It is the purpose of the invention to provide a catalytic converter construction that is particularly well suited for sale in the motor vehicle aftermarket in the form of replacement converters that if properly installed with properly operating engines will enable vehicles to meet applicable governmental requirements relating to exhaust emissions and which will fit within the width and length space envelopes of the O.E. converters which they replace and with the same or greater spacing from the vehicle underbody and ground clearance.

In a preferred embodiment, the invention accomplishes the foregoing purpose by means of converter construction having a clamshell housing made of stainless steel with inlet and outlet bushings of the same material, and an integral heat shield. The converter includes a catalyst coated substrate supported in the housing by a surrounding mat of heat expandable material that engages the housing walls in a very slip resistant manner. By proper selection of the substrate and mat, as well as housing dimensions, whether air is injected into the housing to enhance oxidation of unburned exhaust gases, one converter construction according to the invention may be used with many different engine families and many different vehicle models. The invention therefore, in a sense, provides a "universal" catalytic converter that can be substituted for many different O.E. converters, without sacrifice in emission control. The "universality" feature makes it possible to greatly reduce the inventory needed by repair shops, as compared with an inventory of O.E. converters, and this should be reflected on the consumer level in better service and lower prices.

A serious need for a replacement converter of the universal type appears to be imminent. At the present time there are about 90 million motor vehicles on the road in the United States that are equipped with O.E. catalytic converters. About half of these vehicles are over 5 years old. While converters have a relatively long life compared to acoustic mufflers, many of them do have to be replaced. They may become mechanically damaged due to accidents, etc.; the catalyst substrates may become blocked or clogged; the converter or associated parts may rust out; and problems may be discovered during mandatory emission inspections. Such inspection programs are growing and can be expected in the near future to cover most of the vehicles in use. As they force defective O.E. converters to be removed from vehicles, the need to promptly replace them with acceptable aftermarket converters at acceptable prices can be expected to grow. It is an object of the invention to provide aftermarket converter construction that will serve as a means to meet this need. More particularly, it is an object of the invention to provide aftermarket catalytic converters that meet the emission standards of the Clean Air Act, as amended, (42 U.S.C. 7521 et seq.) as applied by the Environmental Protection Agency (EPA) and so that their installation does not violate the tampering prohibitions of the Act. It is a further object to provide converters that are in compliance with the state of California policy relative to acceptance of aftermarket catalytic converters.

DETAILED DESCRIPTION OF THE INVENTION

Figure 3:
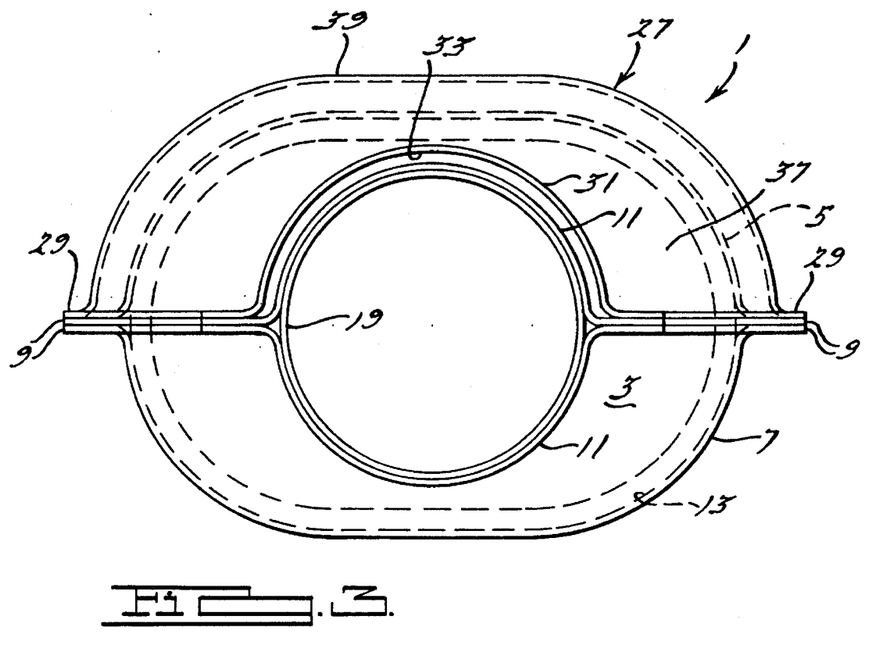
FIG. 3 is an end elevation at the inlet end of the converter of FIGS. 1 and 2.

A catalytic converter construction 1, according to the present invention, includes a housing 3 composed of complementary upper and lower "clamshell" halves 5 and 7 pressed from sheet stainless steel. The halves are pan-shaped with rims on opposite sides in the form of flat, longitudinal flanges 9 that are joined at their opposite ends by semicircular transverse flanges 11. At assembly, the flanges 9 for the upper and lower halves 5 and 7 are seam welded together as seen at 12. When this is done, the upper and lower semicircular flanges 11 define circular openings at opposite ends of the housing 3 as been best in FIG. 3. The housing 3 is substantially symmetrical about its longitudinal centerline or axis and the circular openings at each end are concentric with this centerline. The housing is also substantially symmetrical about a transverse midplane and a longitudinal midplane.

Figure 1:
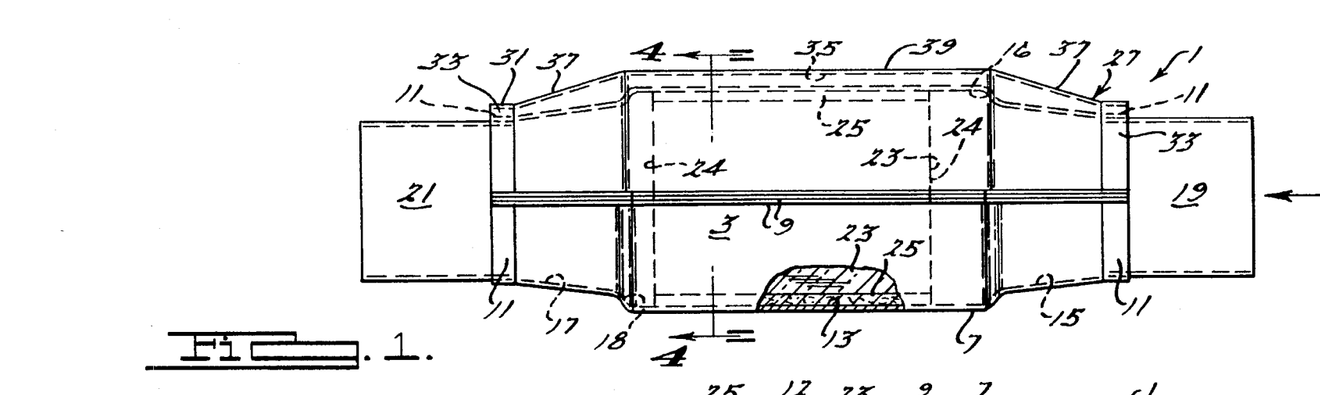
FIG. 1 is a side elevation, partly broken away, of a catalytic converter embodying the invention.
Figure 2:
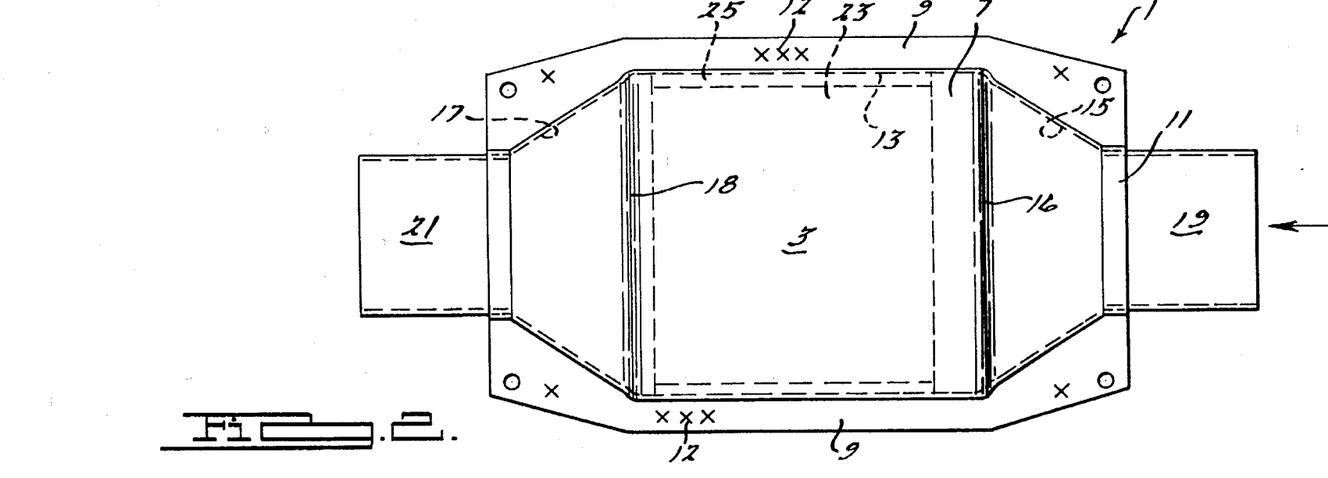
FIG. 2 is a bottom plan view of the converter of FIG. 1.
Figure 4:
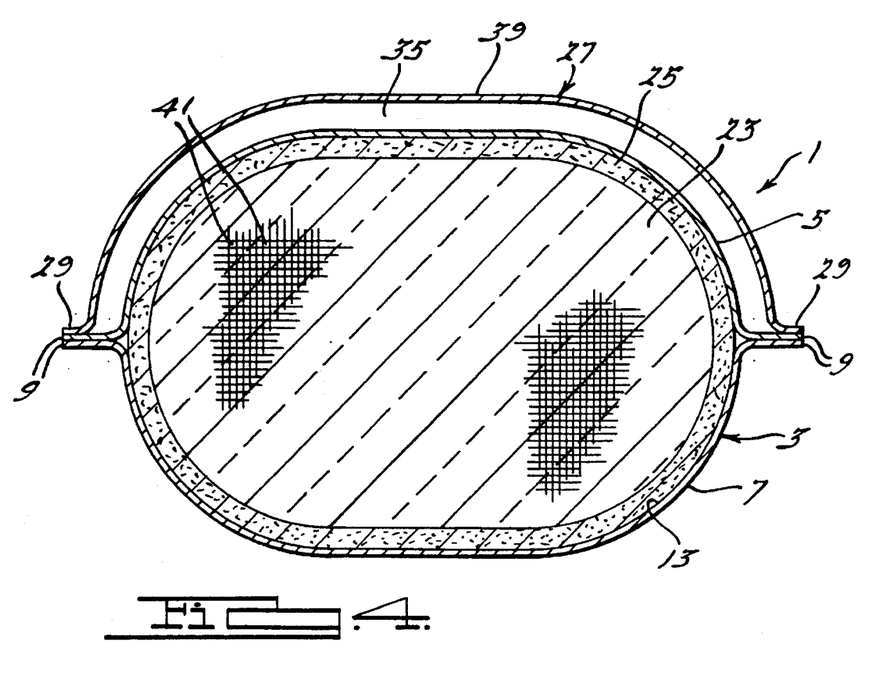
FIG. 4 is a cross-section along the lines 4—4 of FIG. 1.
Figure 5:
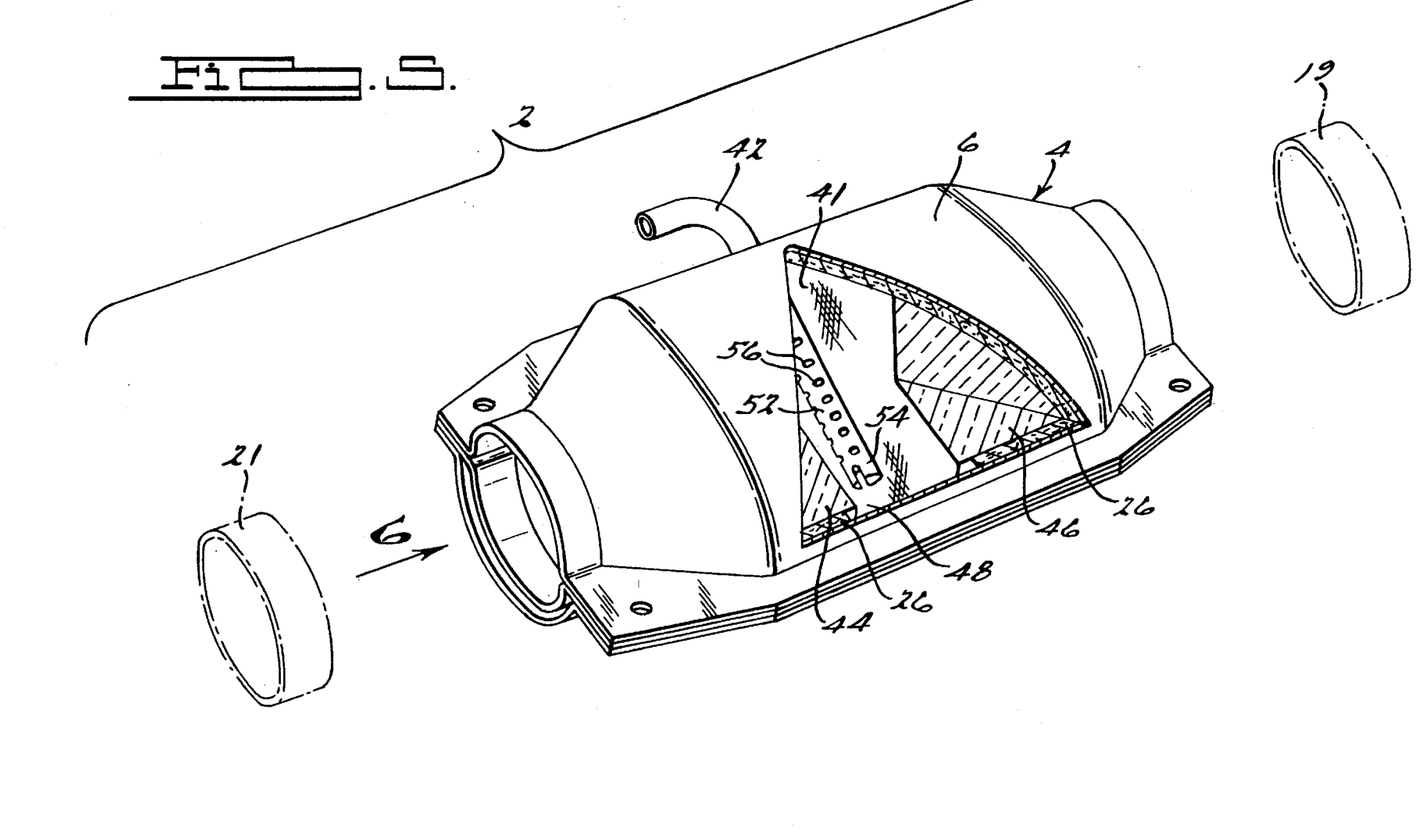
FIG. 5 is a top plan view in perspective of another catalytic converter embodying the invention.
Figure 6:
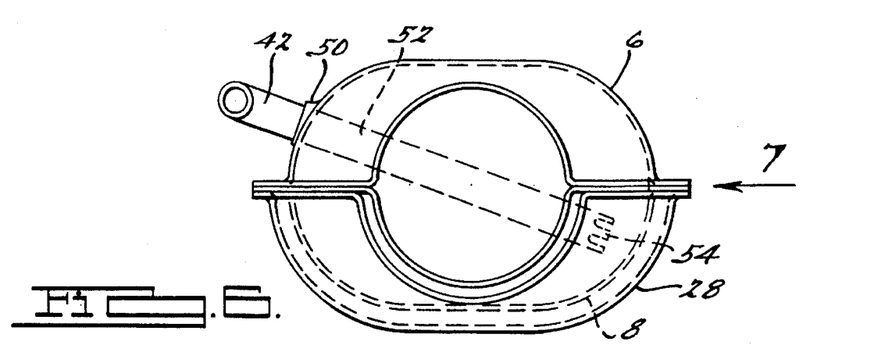
FIG. 6 is an end view taken in the direction of the arrow 6 in FIG. 5.
Figure 7:
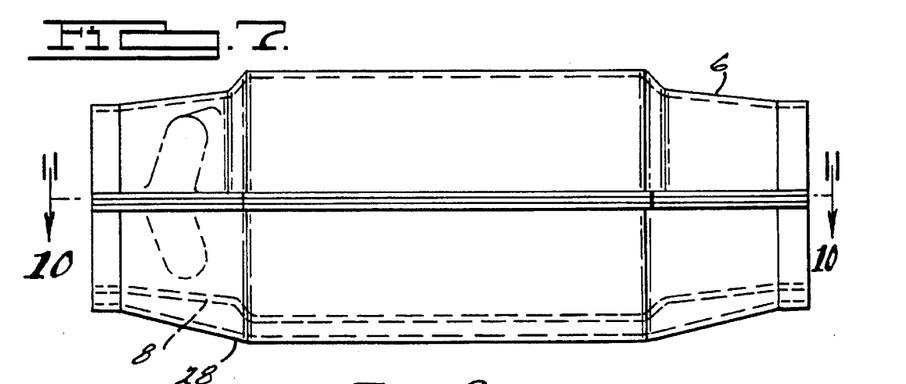
FIG. 7 is a side elevation view taken in the direction of the arrow 7 in FIG. 6.
Figure 8:
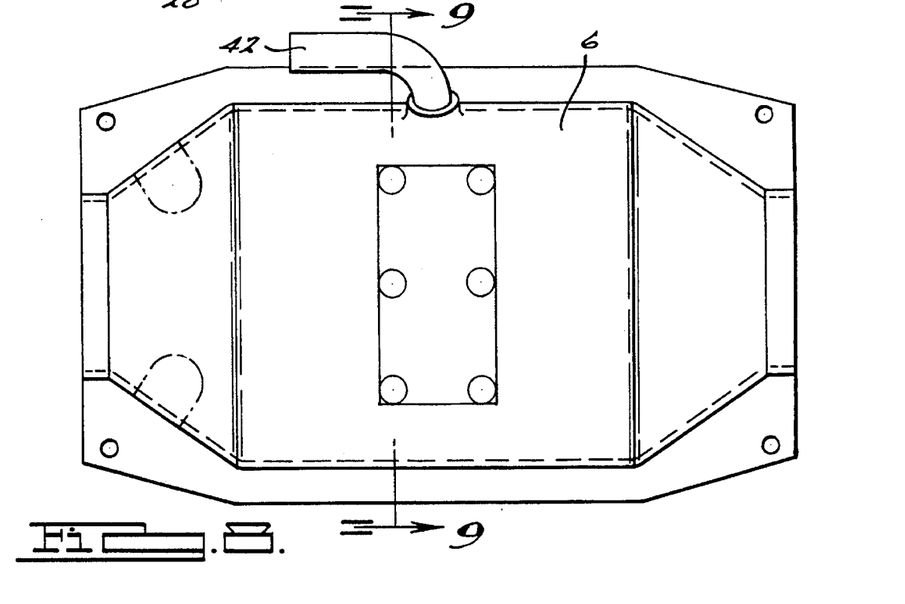
FIG. 8 is a top plan view of the converter shown in FIG. 6.

The halves 5 and 7 are shaped so that upon assembly they define a centrally positioned, elongated, catalyst substrate chamber 13, of uniform, oval, cross-section along its length. The halves 5 and 7 further define a tapered, gas inlet chamber 15 extending from the flange 11 at one end of the housing to a short 45° tapered section or shoulder 16 which blends into the adjacent or upstream end of substrate chamber 13; and they also define a tapered, gas outlet chamber 17 extending from the flanges 11 at the other end of the housing to a 45° tapered section 18 which blends into the adjacent or downstream end of the substrate chamber 13. An inlet bushing 19 of circular cross-section is attached to housing 3 and fits inside and is welded at its downstream end to a flange 11 so that it opens into the inlet chamber 15. An outlet bushing 21 of circular cross-section is also attached to housing 3 and fits inside and is welded at its upstream end to the other flange 11 so that it opens into the outlet chamber 17.

Prior to welded assembly of the parts described above, a ceramic monolith, honeycomb-type, catalyst substrate 23, of oval cross-section and flat inlet and outlet ends 24, and its surrounding oval, annular uniformly thick support mat and cushion 25 are placed in the substrate chamber 13. The support mat 25 is composed of a gas impervious, vermiculite based material, available on the open market, which expands substantially upon heating, and is compressed at assembly of the halves 5 and 7 to about one-half of its preassembly or free state thickness. Since the coefficient of friction between the mat 25 and the steel halves 5 and 7 is substantial and is augmented by expansion of the mat due to the high coefficient of heat expansion of the mat material, the mat 25 strongly resists slipping the steel due to conditions of use and pressure of exhaust gases applied to it and the substrate. Consequently, the walls of the halves 5 and 7 can be smooth and unribbed, as shown in the drawings, and in contrast to most original equipment converters which are ribbed to help hold metal-type substrate supports in place. The smaller or upstream dimension of the tapered section or shoulder 16 is slightly less than the corresponding outer dimension of the oval substrate 23 and therefore protects the inlet end of the mat 25 to some degree against direct impingement by the incoming exhaust gas.

A "clamshell" type heat shield 27, pressed from sheet steel to a shape corresponding to upper half 5, is placed over the top of the housing 3 and united to it. It is pan-shaped with a rim around its edge composed of flat longitudinal flanges 29 that are joined at their ends by semicircular transverse flanges 31. The shield 27 is sized to that when its flanges 29 are spot welded to flanges 9, the semicircular flanges 31 are radially spaced from semicircular flanges 11 to provide semicircular openings 33 at each end to the space 35 between the heat shield and the outer periphery of clamshell half 5. The space 35 is provided by the tapered end sections 37 spaced above the inlet and outlet chambers 15 and 17 of the housing 3 and the central section 39 that extends longitudinally parallel to the substrate chamber 13 of housing 3. Air can flow through space 35 by way of the end openings 33. The top shield 27 and the space 35 serve to separate and insulate the floor or underbody of a vehicle (not shown) from the heat generated in the converter housing 3.

FIGS. 5-10 show a three way oxidation and reduction catalytic converter 2 which has the same general exterior envelope as the catalytic converter 1 described in connection with FIGS. 1-4 but which has a tube 42 for injecting air into the converter for enhancing oxidation of exhaust gases. Converter 2 advantageously achieves the same universal adaptability in that the length, width and height is the same and provides the same mating diameter for installation of inlet and outlet bushings 19 and 21.

Converter 2 includes a housing 4 defined by top and bottom clamshells 6 and 8, a heat shield 28 united to clamshell 6, and an air tube 42 permanently fixed and sealed to clamshell 8. Housing 4 encloses a reducing substrate 44 and an oxidizing substrate 46, each substrate having the same geometric shape as substrate 23 and including a plurality of passages 41 extending longitudinally between the substrate ends. Housing 4, except for the air tube and catalysts, has the same exterior geometric shape as housing 3 (e.g., has like semicylindrical rims and longitudinal rims, tapered inlet and outlet gas chambers, and substantially symmetrical about a transverse midplane and a longitudinal midplane).

Figure 9:
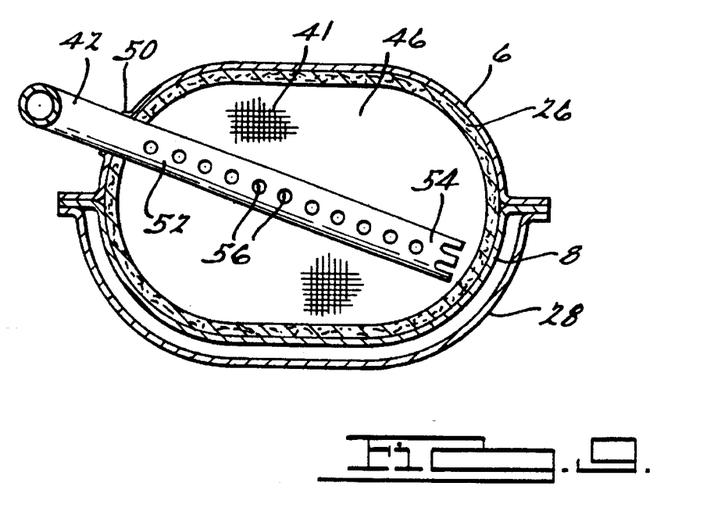
FIG. 9 is a section view taken along line 9—9 of FIG. 8.
Figure 10:
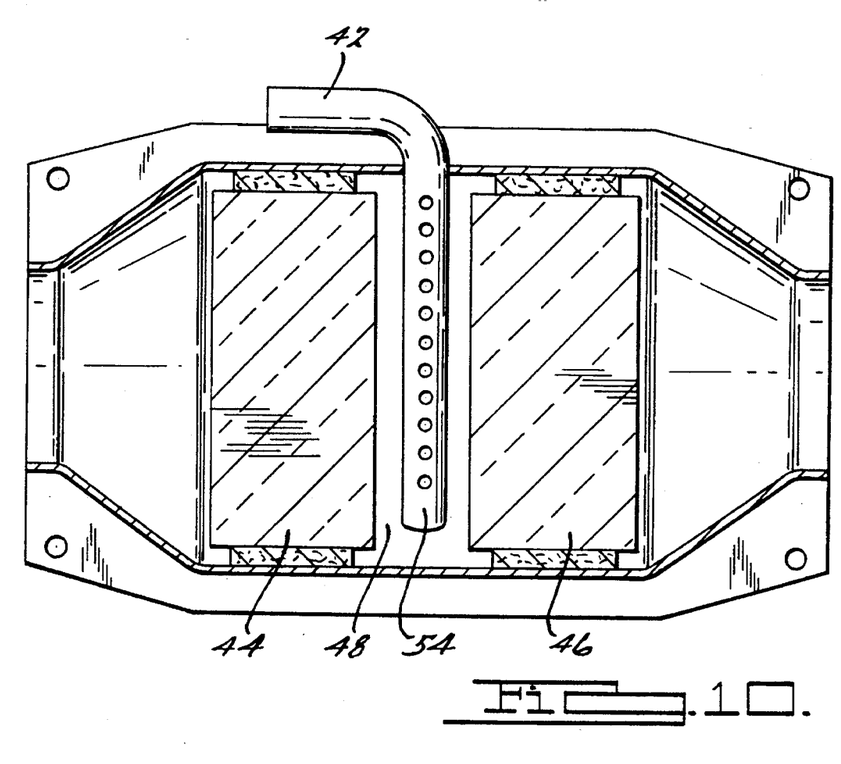
FIG. 10 is a section view taken in the direction of line 10—10 of FIG. 7 with the entire air inlet tube shown for clarity.

As before, substrates 42 and 44 are held in place by a respective annular support mat 26 being compressed between the inner walls of the clamshells and the outer periphery of the substrate, the two substrates 44 and 46 being axially spaced to define a central cavity 48 for receiving oxygen supplied through the air tube. The tube includes a medial portion 52 extending through a sealed boss 50 on clamshell 8 and an end portion 54 disposed in cavity 48. End portion has apertures 56 along its length and terminates in an open end disposed in the cavity 48 but spaced from the shell walls to permit thermal expansion of the tube due to the hot exhaust gases being passed through the converter. As noted before the mats are comprised of vermiculite, each mat being compressively sandwiched 360° about each of the respective catalysts. After the housing assembly is welded together, the support mats do not extend beyond the end faces of its substrate.

Gases in the form of nitrous oxides ($NO_x$), carbon monoxide (CO) and hydrocarbons (HC) are received by bushing 19 at one end of converter 2 and passed through the passages of substrate 44 into central cavity 48 wherein medial portion 52 of air tube 42 is disposed. Substrate 44 utilizes a reducing catalyst that consists of platinum, palladium and/or rhodium. Secondary air ($O_2$) is injected to the cavity by the tube and the gas mixture is oxidized as it passes through catalyst 46. Gases in the form of nitrogen ($N_2$), water ($H_2O$) and carbon dioxide ($CO_2$) pass through oxidizing substrate 46 and outwardly of bushing 21 at the other end of converter 2. Substrate 46 is an oxidizing substrate and is comprised of platinum, palladium and/or rhodium.

The majority of the millions of passenger cars and trucks now on the road in the United States can be broken down into about four hundred and fifty-two (452) specific catalytic converter applications on the basis of (a) vehicle make and model, (b) model year, and (c) engine and number of cylinders. Rather surprisingly, one specific construction of catalytic converter 1 and 2, conforming to EPA and State of California policies on aftermarket catalytic converters, can be used as a replacement converter for almost half (48%) of these applications. As will be pointed out, this particular first form of converter has an overall length of 14" and inlet and outlet bushings 19 and 21 which are 2" I.D. By changing the sizes of the bushings 19 and 21 (and flanges 11), three other specific constructions can be used as replacement converters for the remaining half (52%) of the four hundred and fifty plus applications. Of these other specific constructions, one has an overall length of 13" and bushings 19 and 21 that are 2¼" I.D. (and cover 25% of the applications); and the other two specific constructions also have an overall length of 14" but have bushings 19 and 21 that are, respectively, 2¼" (and cover 12% of the applications) and 2½" I.D. (and cover 15% of the applications).

These constructions are summarized as follows:

| CONVERTER 1, 2 OVERALL LENGTH (inches) | BUSHING I.D. (inches) | PERCENT OF INSTALLATIONS COVERED |
| --- | --- | --- |
| 13 | 2¼ | 25.5 |
| 14 | 2 | 47.5 |
| 14 | 2¼ | 15.0 |

-continued

| CONVERTER 1, 2 OVERALL LENGTH (inches) | BUSHING I.D. (inches) | PERCENT OF INSTALLATIONS COVERED |
|---|---|---|
| 14 | 2½ | 11.7 |

Thus, only four specific converter constructions (along with appropriate hangers, gaskets, flanges, clamps, and connecting pipes) can be used to replace the O.E. catalytic converter systems in over 450 different vehicles; and these are estimated to cover around 55 million vehicles now in service. Further, the size and geometry of the converter constructions are such that they fit within the width and length space envelopes of the O.E. converters that they replace and with substantially the same or greater ground clearance and substantially the same or greater spacing from the vehicle underbody.

Except for the diameters and lengths of bushings 19 and 21, the four different specific forms of converter 1 and 2 are identical. Thus, it has been discovered that one basic converter housing 3 and 4, substrate 23 and 44, 46 and support mat mounting construction is capable of meeting emission requirements for over four hundred and fifty different O.E. replacement applications and is also capable of being physically fitted on the vehicle as an O.E. replacement for all these vehicles. The basic housing 3 and 4 is about 10" long. For example, in the form of the converter mentioned above which has a length of the inlet and outlet bushings 19 and 21 project 1½" beyond the housing flanges 11. In the other forms, which are 14" long, the bushings project 2" beyond the flanges 11. The basic housing 3 and 4 is about 6" in overall width, about 3½" high and with heat shield 27 and 28 about 3¾" high.

The basic housing 3 has a substrate chamber 13 which is about 5¾" long and 5" wide to contain the substrate 23 which is substantially 4¼" long and preferably has its inlet face 24 located about 1" downstream from the inlet end of the chamber 13. The oval substrate has a major height of about 3", a major width of about 4¾", and a volume of about 55 cubic inches. It is uniformly spaced from the wall of the substrate chamber 13 by about 0.110" to 0.120" (i.e. about ⅛"), this spacing being achieved by the compressed uniform thickness cushion and support mat 25 which surrounds its outer periphery. The ceramic honeycomb monolith substrate 23, which is commercially available (from Corning Glass Works, U.S.A., and NGK Corp., Japan), has a great number of longitudinally extending gas passage cells 41 running from one face 24 to the other. It has a cell density of about 400 cells per square inch and the cell walls are uniformly coated with about 20 grams per cubic foot of substrate of catalysts palladium and rhodium in substantially a 5/1 ratio of palladium to rhodium. Such coating can be done by Engelhard Industries Division of Engelhard Minerals and Chemicals Corp. (U.S.A.). These catalysts are applied to the substrate 23 in housing 3 are effective on motor vehicle engine exhaust gases to reduce oxides of nitrogen and to oxidize hydrocarbons and carbon monoxide to achieve acceptable emission levels for an acceptable period of time as aftermarket or replacement converters for the over four hundred and fifty different applications mentioned, provided in each case that the engine is operating properly and is not improperly tuned or misfiring.

Housing 4 has a chamber 14 substantially the same as chamber 13 (e.g., 5¾" long and 5" wide) to contain and position vermiculite mats and substrates 44 and 46 each substrate having the same cross-section as substrate 23 as described but shorter to accommodate the apertured tap or pipe 42 terminating between the substrates. Substrates 44 and 46 define and inlet face and an outlet face with each face being spaced about 1", respectively, from the inlet end and outlet end, the substrates being uniformly spaced about ⅛" from the chamber wall as a result of the vermiculite being compressed. Converter 2 with air tap 42 performs the same functions as converter 1 without such pipe but is much like two converters in one body. Air injection into the housing 4 enhances oxidation of the heated exhaust gases.

The vehicles in the 450 plus group referred to, for which the present converter is intended as a replacement, include auxiliary or secondary air injection at the converter. For the applications intended, the converters according to the preferred embodiment are in conformance with current EPA policy regarding aftermarket catalytic converters. Thus, their proper installation would not be in violation of the antitampering provisions of the Clean Air Act, as amended 42 U.S.C. 7522. These converters are also in compliance with the policy of the State of California relative to the acceptance of aftermarket catalytic converters.

The inlet and outlet bushings 19 and 21 are preferably made of muffler grade stainless steel tubing (MSS). This enables connecting pipes (not shown) to be slipped inside of a bushing and a gas tight joint achieved by means of conventional U-bolt clamp (not shown) applied around the bushing to clamp it to the pipe. (The usual O.E. converter has welded joints between the converter and the connecting pipes.) The MSS bushings 19 and 21 accommodate a significant variation in pipe sizes; and anticipated variations in pipe size, length, or in longitudinal space available to insert the converter, are accommodated by the selected projecting lengths (1½" and 2") of the bushings which allow one or both bushings to be cut down in length at installation. For example, there is one series of applications for the 2" I.D. bushing and 14" total length converter in which 1" mush be cut off each end. Conceivably, applications could arise in which it would be desirable to omit the bushings 19 and 21 and weld the connecting pipes to the flanges 11, similarly to O.E. installations.

Modifications may be made in specific details shown and described without departing from the spirit and scope of the invention.

I claim:

1. A motor vehicle exhaust gas system aftermarket catalytic converter suitable as a replacement for a variety of original equipment ("O.E.") catalytic converters, said aftermarket catalytic converter comprising a clamshell housing comprised of upper and lower halves each about 10 inches long and having a peripheral rim including semicircular rim sections at opposite ends and longitudinal rim sections extending between said semicircular rim sections, said longitudinal rim sections being welded together and said halves being shaped to jointly form a housing having a centrally located longitudinally extending catalyst substrate chamber about 5.75 inches long, said semicircular rim sections fitting together to define a circular inlet flange and a circular outlet flange, said housing including an inlet chamber increasing in cross-section in a direction extending from the circular inlet flange to an upstream end of said substrate chamber, said housing including an outlet chamber decreasing in cross-section in a direction extending from a downstream end of the substrate chamber to said circular outlet flange, a cylindrical inlet bushing having a downstream end fitting in and welded to said circular inlet flange, a cylindrical outlet busing having an upstream end fitted in and welded to said circular outlet flange, said bushings having a diameter of about 2.0 to 2.5 inches and projecting outwardly about 1.5 to 2.0 inches from said semicircular rim sections whereby the overall length of the housing is about 13 to 14 inches, said housing being substantially symmetrical about a longitudinal axis and said circular flanges and said bushings being substantially concentric with said longitudinal axis, a clamshell heat shield conforming in shape to the upper half of said housing, said heat shield including flat longitudinal side flanges welded to the longitudinal rim sections of said housing and a semicircular section extending laterally between the side flanges and completely spaced from and unconnected to the semicircular rim sections of the housing to provide an uninterrupted insulation space between the opposite ends of the shield, and oval-shaped flat ended catalyst substrate of the catalyst coated honeycomb-type disposed in said substrate chamber, an annular uniform thickness substrate support mat surrounding the entire outer peripheral surface of said substrate and in engagement with the wall of the chamber to centrally locate and support the substrate in the chamber and substantially uniformly space the outer peripheral surface of the substrate about 0.125 inch from the walls of the chamber, said support mat being composed of a heat expandable vermiculite base material and compressed between the walls of the chamber and the outer peripheral surface of the substrate to about one-half of its preassembled free state thickness, said substrate being about 4.25 inches long and having a major height of about 3.0 inches, a major width of about 4.75 inches, and a volume of about 55 cubic inches, said substrate having a multiplicity of longitudinally extending exhaust gas passage honeycomb cells at a density of substantially 400 cells per square inch, the walls of said cells being coated with a catalyst effective in the reduction of oxides of nitrogen and the oxidation of hydrocarbons and carbon monoxide, said catalyst comprising substantially five parts palladium and one part rhodium applied in a coating of about 20 grams per cubic foot of substrate.

2. A converter as set forth in claim 1 wherein the major height of said clamshell housing is about 3½", and the major height of said heat shield and said converter is about 3¾".

3. A motor vehicle exhaust gas system aftermarket catalytic converter suitable as a replacement for a variety of original equipment ("O.E.") catalytic converters, said aftermarket catalytic converter comprising a clamshell housing about 3.5 inches high comprised of upper and lower halves each about 10 inches long and having a peripheral rim including semicircular rim sections at opposite ends and longitudinal rim sections extending between said semicircular rim sections, said longitudinal rim sections being welded together and said halves being shaped to jointly form a housing having a centrally located longitudinally extending uniform size oval cross-section catalyst substrate chamber about 5.75 inches long, said semicircular rim sections fitting together to define a circular inlet flange and a circular outlet flange, said housing including an inlet chamber increasing in cross-section in a direction extending from the circular inlet flange to an upstream end of said substrate chamber, said housing including outlet chamber decreasing in cross-section in a direction extending from a downstream end of the substrate chamber to said circular outlet flange, a cylindrical inlet bushing having a downstream end fitting in and welded to said circular inlet flange, a cylindrical outlet bushing having an upstream end fitted in and welded to said circular outlet flange, said bushings projecting outwardly about 1.5 to 2.0 inches from said semicircular rim sections whereby the overall length of the upper housing is about 13 to 14 inches, said housing being substantially symmetrical about a longitudinal axis and said circular flanges and said bushings being substantially concentric with said longitudinal axis, a clamshell heat shield conforming in shape to said upper housing half and secured thereto solely by longitudinal side flanges being welded to the longitudinal rim sections of the housing said heat shield forming a continuous uninterrupted semicircular shell, portion above said upper housing half and providing an insulation space open at opposite ends of said shell, an oval-shaped flat ended catalyst substrate of the catalyst coated honeycomb-type in said substrate chamber, an annular uniform thickness substrate support mat surrounding the entire outer peripheral surface of said substrate and in engagement with the wall of the chamber to centrally locate and support the substrate in the chamber and substantially uniformly space the outer peripheral surface of the substrate about 0.125 inch from the walls of the chamber, said support mat being composed of a heat expandable vermiculite base material and compressed between the walls of the chamber and the outer peripheral surface of the substrate to about one-half of its preassembled free state thickness, said oval cross-section substrate being about 4.25 inches long and having a major height of about 3.0 inches, and a major width of about 4.75 inches and a volume of about 55 cubic inches, said substrate having a multiplicity of longitudinally extending exhaust gas passage honeycomb cells at a density of substantially 400 cells per square inch, the walls of said passages being coated with a catalyst effective in the reduction of oxides of nitrogen and the oxidation of hydrocarbons and carbon monoxide, said catalyst comprising substantially five parts palladium and one part rhodium applied in a coating of about 20 grams per cubic foot.

4. A converter as set forth in claim 3 wherein said heat shield and said converter have a major height of about 3¾".

5. A motor vehicle exhaust gas system aftermarket catalytic converter suitable as a replacement for a variety of original equipment ("O.E.") catalytic converters comprising a clamshell housing comprised of upper and lower halves including flat longitudinal rim sections extending between semicircular rim sections, the longitudinal rim sections being welded together to jointly form a housing substantially symmetrical about a longitudinal axis and having a centrally located longitudinally extending uniform size oval cross-section catalyst substrate chamber, said longitudinal and semicircular rim sections at opposite ends of the housing fitting together to define a circular inlet flange and a circular outlet flange, a circular cylindrical inlet bushing fitting in and welded to said circular inlet flange, a circular cylindrical outlet bushing fitting in and welded to said circular outlet flange, catalyst means including an oval-shaped flat ended catalyst substrate in said substrate chamber for reacting with exhaust gases passed through the housing, support means comprising an annular uniform thickness substrate support mat composed of a heat expandable vermiculite base material for surrounding and substantially uniformly spacing the substrate from the walls of the chamber, said converter further characterized by said housing halves each being about 10 inches long and said bushings having inner diameters in the range of 2.0 to 2.5 inches and projecting outwardly a distance in the range of 1.5 to 2.0 inches from the semicircular rim sections of said housing whereby the overall length of the housing and bushings is in the range of 13 to 14 inches, a clamshell heat shield conforming in shape to said upper housing half and connected to said housing only along the longitudinal rim sections of said upper housing half, said shield including longitudinal peripheral flanges welded to the longitudinal rim sections of said housing, and a semicircular housing section spaced from the semicircular rim sections of the housing and spaced above the upper half of the housing to provide an insulation space open at opposite ends of the housing section, said substrate having extended between its opposite end faces a multiplicity of longitudinally extending exhaust gas passages each coated with a catalyst effective in the reduction of oxides of nitrogen and the oxidation of hydrocarbons and carbon monoxide.

6. A converter as set forth in claim 5 including inlet means for injecting air into said catalyst chamber, said inlet means comprising a tubular member having opposite end portions with one end portion being secured in sealed relation to one clamshell half of said housing at a location spaced from said longitudinal rim sections.

7. A converter as set forth in claim 6 including a pair of coaxial, axially spaced substrates, and wherein said tubular member includes an apertured portion which extends into the axial space formed between said substrates.

8. A converter as set forth in claim 5 wherein said clamshell housing is about 3½" high and said heat shield and said converter having a total height of about 3¾".

9. In a catalytic converter of the type used in motor vehicle exhaust systems, a housing of the clam-shell type and open at each end, said housing including upper and lower shell halves having mating flanges extending longitudinally along respective shell edges, a reducing catalyst substrate and an oxidizing catalyst substrate disposed in said housing, support means, including a resilient support mat encircling each said substrate, for securing and locating the substrates in said housing relative to the respective ends of the housing and such that the substrates are axially spaced from one another whereby to form a central chamber, means for communicating air into said central chamber from a source external to said housing to aid in the oxidation and reduction process as exhaust gases are passed through the housing, and heat shield means comprising a single one piece sheet of material conforming in shape to the upper shell half of said housing and extending longitudinally in superposing relation above the housing, said sheet of material including longitudinal peripheral rim sections welded to said longitudinal mating flanges of the housing with the rim sections and mating flanges being disposed in a common plane passing through the central axis of the housing.

10. The converter as recited in claim 9 wherein said means for communicating air comprises an elongated tube having opposite end portions and perforations disposed therealong, and means for securing one end portion of said tube into the wall of extending through said housing, the other end portion of said tube being spaced from the interior surface of the housing and the end thereof opening, into said central chamber.

11. In a catalytic converter for internal combustion exhaust gases and of the type having catalyst means mounted in a housing of the clamshell type and open at each end, said housing being comprised of an upper and a lower shell member having mating flanges which are sealingly welded together and extend longitudinally along opposite sides thereof, and means for communicating air into said housing for oxidation of the exhaust gases, the improvement comprising said catalyst means including a pair of oval-shaped flat ended substrates, one and the other substrate being, respectively, a reducing substrate and an oxidizing substrate, support means for mounting the substrates in said housing such that the outer peripheral surfaces of the substrates are spaced from the walls of the housing and located in axially spaced relation to define a chamber between respective end faces, said means for communicating air into the housing comprises an elongated tube having perforations disposed between its opposite end portions, one end portion being secured to one said shell member at a location spaced from said mating flanges and the other end portion opening into said chamber, and a clamshell heat shield comprising a single one piece sheet of material having longitudinal peripheral rim sections and extending longitudinally between opposite longitudinal ends, said sheet conforming in shape to said upper shell member and being connected to the housing solely by said longitudinal peripheral rim sections being welded to the mating flanges of said housing and including semicircular rim sections at said opposite ends, said semicircular rim sections being formed by a continuous uninterrupted edge of said sheet that extends between said longitudinal rim sections and is spaced from the housing to provide an insulation space open at opposite ends.

\* \* \* \* \*

UNITED STATES PATENT AND TRADEMARK OFFICE
CERTIFICATE OF CORRECTION

PATENT NO. : 5,482,681
DATED : January 9, 1996
INVENTOR(S) : Robert L. Sager, Jr.

It is certified that error appears in the above-indentified patent and that said Letters Patent is hereby corrected as shown below:

Column 2, Line 50, "been" should be --seen--.

Column 3, Line 19, after "slipping" insert --on--.

Column 3, Line 36, "to" should be --so--.

Column 6, Line 40, "mush" should be --much--.

Column 7, Line 4, Claim 1, "busing" should be --bushing--.

Signed and Sealed this

Twentieth Day of August, 1996

Attest:

BRUCE LEHMAN

Attesting Officer     Commissioner of Patents and Trademarks